US009952686B2

(12) United States Patent
Serizawa

(10) Patent No.: US 9,952,686 B2
(45) Date of Patent: *Apr. 24, 2018

(54) DESKTOP INFORMATION PROCESSING APPARATUS AND CONTROL METHOD FOR INPUT DEVICE

(71) Applicant: TOSHIBA TEC KABUSHIKI KAISHA, Shinagawa-ku, Tokyo (JP)

(72) Inventor: Yasutoshi Serizawa, Shizuoka-ken (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/498,794

(22) Filed: Apr. 27, 2017

(65) Prior Publication Data

US 2017/0228113 A1 Aug. 10, 2017

Related U.S. Application Data

(63) Continuation of application No. 14/219,378, filed on Mar. 19, 2014.

(51) Int. Cl.
*G06F 3/0354* (2013.01)
*G06F 3/0482* (2013.01)
(Continued)

(52) U.S. Cl.
CPC ........ *G06F 3/03543* (2013.01); *G06F 3/0346* (2013.01); *G06F 3/03545* (2013.01);
(Continued)

(58) Field of Classification Search
CPC .... G06F 3/0482; G06F 3/041; G06F 3/03543; G06F 2203/0382; G06F 3/03547;
(Continued)

(56) References Cited

U.S. PATENT DOCUMENTS

2008/0027804 A1 1/2008 Kaplan
2008/0291174 A1 11/2008 Mazeev et al.
(Continued)

OTHER PUBLICATIONS

Non-Final Office Action for U.S. Appl. No. 14/219,378 dated Sep. 23, 2015.
(Continued)

*Primary Examiner* — Abhishek Sarma
(74) *Attorney, Agent, or Firm* — Amin, Turocy & Watson LLP

(57) ABSTRACT

In accordance with one embodiment, a desktop information processing apparatus comprises a display section, a touch panel, a device controller and a control section. The display section has a display surface on the top plate of the desktop information processing apparatus. The touch panel is positioned on the display surface of the display section. The device controller acquires operation information of a user from a device different from the touch panel. The control section controls the display section to display a list screen for the user to selectively validate or invalidate the operation on the touch panel and the operation on the device from which the operation information is acquired by the device controller. Further, the control section conducts a control to validate or invalidate the operation on the touch panel and the operation on the device according to the selection of the user.

4 Claims, 8 Drawing Sheets

(51) Int. Cl.
*G06F 3/041* (2006.01)
*G06Q 10/10* (2012.01)
*G06F 3/0346* (2013.01)

(52) U.S. Cl.
CPC .......... *G06F 3/03547* (2013.01); *G06F 3/041* (2013.01); *G06F 3/0482* (2013.01); *G06Q 10/10* (2013.01); *G06F 2203/0381* (2013.01); *G06F 2203/0382* (2013.01)

(58) Field of Classification Search
CPC ............... G06F 3/0346; G06F 3/03545; G06F 2203/0381; G06Q 10/10
See application file for complete search history.

(56) References Cited

U.S. PATENT DOCUMENTS

| | | |
|---|---|---|
| 2010/0039402 A1 | 2/2010 | Okazaki |
| 2010/0083109 A1 | 4/2010 | Tse et al. |
| 2012/0204106 A1 | 8/2012 | Hill et al. |
| 2013/0207898 A1 | 8/2013 | Sullivan et al. |
| 2013/0314330 A1 | 11/2013 | Peterson et al. |
| 2014/0002399 A1 | 1/2014 | Kambhatla et al. |

OTHER PUBLICATIONS

Final Office Action for U.S. Appl. No. 14/219,378 dated Apr. 8, 2016.
Non-Final Office Action for U.S. Appl. No. 14/219,378 dated Jul. 28, 2016.

| ID | SETTING NAME | PATH | APPLICATION NAME | TOUCH PANEL | MOUSE | POINTER |
|---|---|---|---|---|---|---|
| 0001 | DEFAULT | - | DEFAULT SETTING | 1 | 1 | 0 |
| 0002 | NEGOTIATION | c:¥Program Files¥··· | NEGOTIATION TOOLS | 1 | 0 | 0 |
| 0003 | CONFERENCE | c:¥Program Files¥··· | - | 0 | 1 | 1 |
| 0004 | SETTLEMENT | c:¥Program Files¥··· | SETTLEMENT TOOLS | 0 | 1 | 0 |

FIG.6

DESKTOP INFORMATION PROCESSING APPARATUS AND CONTROL METHOD FOR INPUT DEVICE

CROSS-REFERENCE TO RELATED APPLICATIONS

This application is a Continuation of U.S. application Ser. No. 14/219,378 filed on Mar. 19, 2014, the entire contents of which are incorporated herein by reference.

FIELD

Embodiments described herein relate to an information processing apparatus provided with a touch panel display.

BACKGROUND

A touch panel display has been used in a portable terminal apparatus or a notebook computer as a user interface in recent years. Further, a desktop information processing apparatus is being developed which has a big touch panel display on the top plate surface thereof and is capable of achieving a multi-person brief meeting.

When the touch panel of a desktop information processing apparatus is touched by a plurality of users, sometimes it is difficult for the users to operate the touch panel as the distance there between is too close. Additionally, some users reject a crowded environment.

BRIEF DESCRIPTION OF THE DRAWINGS

FIG. 6 is a diagram illustrating an example of a management table of the input device;

DETAILED DESCRIPTION

In accordance with one embodiment, a desktop information processing apparatus comprises a display section, a touch panel, a device controller and a control section. The display section has a display surface on the top plate of the desktop information processing apparatus. The touch panel is positioned on the display surface of the display section. The device controller acquires operation information of a user from a device different from the touch panel. The control section controls the display section to display a list screen for the user to selectively validate or invalidate the operation on the touch panel and the operation on the device from which the operation information is acquired by the device controller. Further, the control section conducts a control to validate or invalidate the operation on the touch panel and the operation on the device according to the selection of the user.

In the conventional desktop information processing apparatus, only a touch panel can be operated, however, in the present embodiment, a pointing device such as a mouse can also be used like a touch panel. Thus, a user can operates the desktop information processing apparatus described herein at a near distance without approaching the display. The user only uses a touch panel when desiring to share information at a near distance and a touch panel and a pointing device or only a pointing device when desiring to share information at a certain distance.

Further, the user can selectively validate or invalidate each input device to make a flexible setting.

Figure 1:
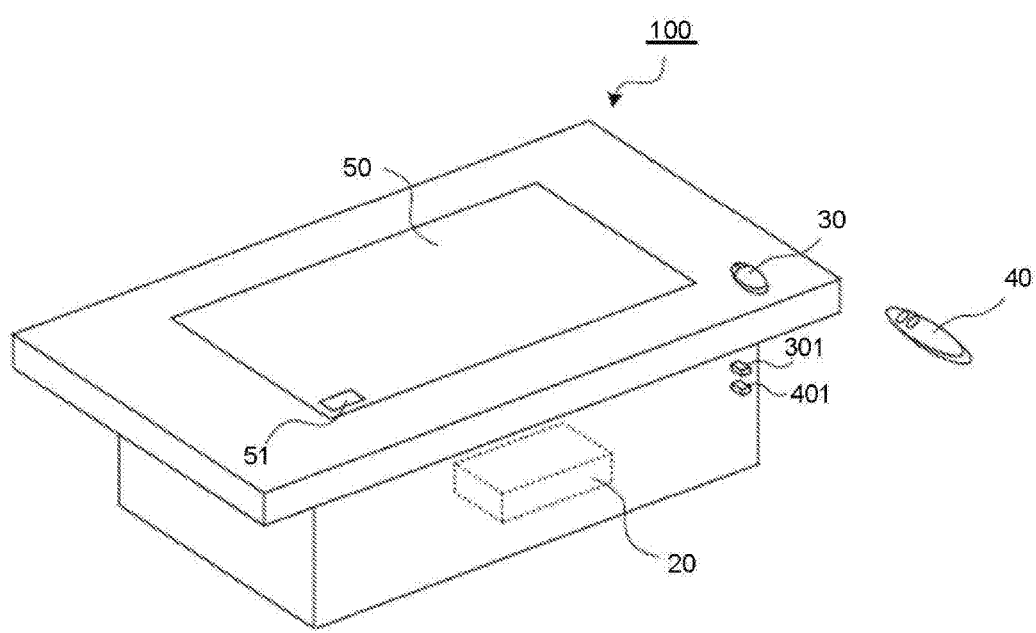
FIG. 1 is an oblique view illustrating a desktop information processing apparatus according to an embodiment.

FIG. 1 is a diagram illustrating the appearance of a desktop information processing apparatus 100 according to an embodiment and is a perspective view for part of the desktop information processing apparatus 100. The desktop information processing apparatus 100 has a flat top plate surface for a conference or negotiation, and a touch panel display 50 arranged on the top plate surface for information sharing. With the touch panel display 50, the desktop information processing apparatus 100 can be simultaneously used by a plurality of users.

Further, the desktop information processing apparatus 100 comprises a control section 20, a mouse controller 301 and a pointer controller 401. The control section 20 is a computer system for uniformly controlling the touch panel display 50, the mouse controller 301 and the pointer controller 401. The mouse controller 301 receives an input signal from a mouse 30, carries out a data conversion and outputs operation information of the user to the control section 20. The pointer controller 401 receives an input signal from a pointer 40, carries out a data conversion and outputs operation information of the user to the control section 20.

Further, a management screen 51 of an input device is continuously displayed on the touch panel display 50 of the desktop information processing apparatus 100. As shown in FIG. 1, to prevent an error user operation, the management screen 51 is continuously displayed on an end part of the display area of the touch panel display 50. The management screen 51 can be moved through an operation of the user. A specific example of the display of the management screen 51 will be described later.

Figure 2:
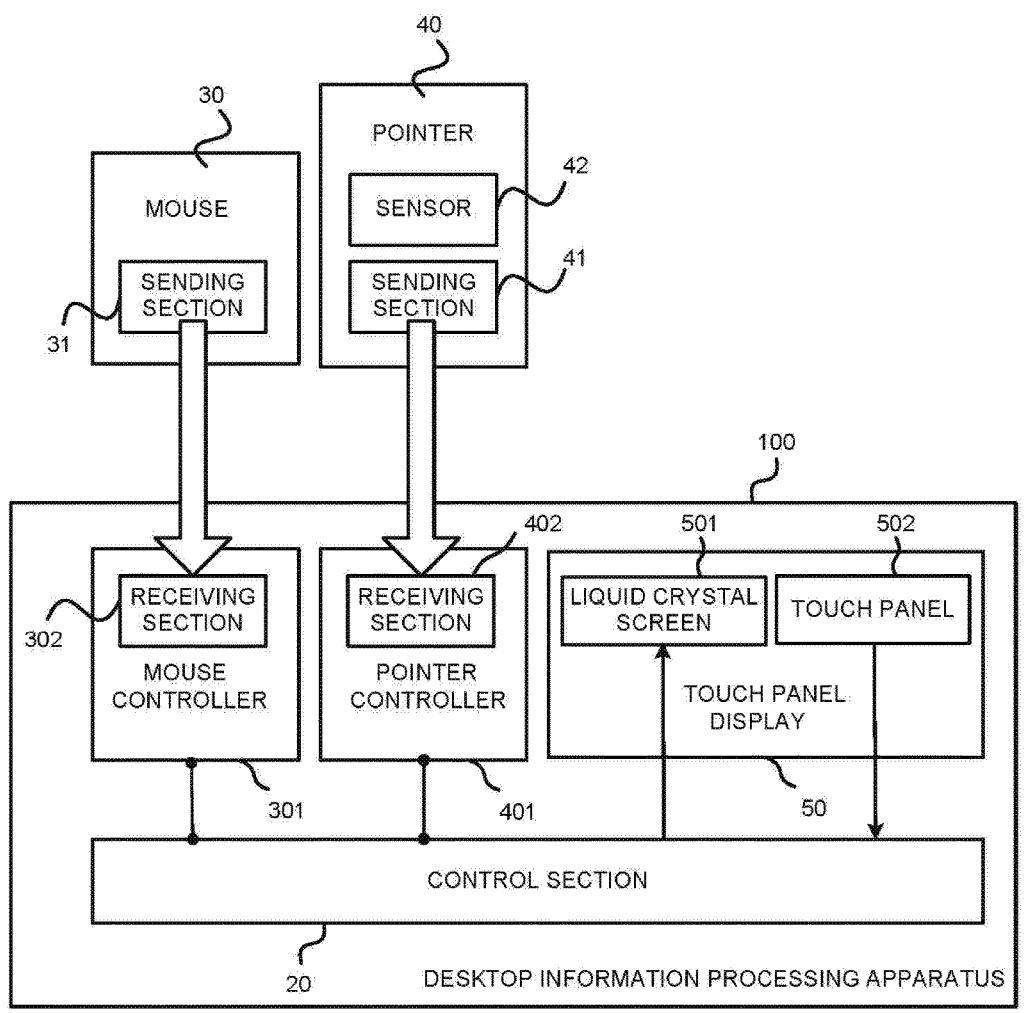
FIG. 2 is a block diagram illustrating an example of the configuration of an input device and the desktop information processing apparatus according to the embodiment.

FIG. 2 is a block diagram illustrating an example of the configuration of the desktop information processing apparatus 100 and each input device.

As an input device, the mouse 30 is an existing device which is therefore not described herein. The mouse 30 has a sending section 31 based on the near-distance wireless communication standard which sends the position information of the mouse 30 and operation information such as 'a physical button is pressed' to the mouse controller 301.

The pointer 40 in a size of the palm of a hand has a sensor 42 for detecting the motion of the pointer 40. In this embodiment, the sensor 42 is a gyro sensor. With the sensor 42, the pointer 40 detects the direction pointed by the user holding the pointer. Further, the pointer 40 detects the press on a physical button on the pointer 40. The pointer 40 sends the pointed direction and information 'button is pressed' to the pointer controller 401 via the sending section 41. Like the sending section 31 of the mouse 30, the sending section 41 is a unit based on the near-distance wireless communication standard. A pointer icon displayed on the touch panel display 50 is linked with the direction pointed by the pointer 40 and clicking operation is carried out according to the press on the physical button of the pointer 40.

The mouse controller 301 has a receiving section 302 which receives data sent from the sending section 31 of the mouse 30 based on the near-distance wireless communication standard. The mouse controller 301 has a terminal in accordance with the USB (Universal Serial Bus) standard and is connected with the control section 20 through the terminal. The mouse controller 301 receives position information and operation information such as 'physical button is pressed' from the mouse 30 and outputs the received information to the control section 20.

The pointer controller 401 has a receiving section 402 which receives data sent from the sending section 41 of the pointer 40 based on the near-distance wireless communication standard. The pointer controller 401 has a terminal in accordance with the USB standard and is connected with the control section 20 through the terminal. The pointer controller 401 receives direction information and operation information such as 'physical button is pressed' from the pointer 40 and outputs the received information to the control section 20.

As shown in FIG. 1, the mouse controller 301 and the pointer controller 401 are detachably mounted on a side wall of the housing of the desktop information processing apparatus 100, however, the mouse controller 301 and the pointer controller 401 can also be arranged inside the housing of the desktop information processing apparatus 100. Further, the mouse controller 301 and the pointer controller 401 may also be arranged inside the controller section 20.

The touch panel display 50 comprises a flat liquid crystal screen 501 and a touch panel 502. The display surface of the liquid crystal screen 501 faces the top plate of the desktop information processing apparatus 100 (referring to FIG. 1). The touch panel 502, which is laminated on the display surface of the liquid crystal screen 501, detects fingertips or pen points of a plurality of user simultaneously and then outputs information indicating whether or not there is a touching operation with fingertips or pen points of users and the detected positions to the control section 20.

Figure 3:
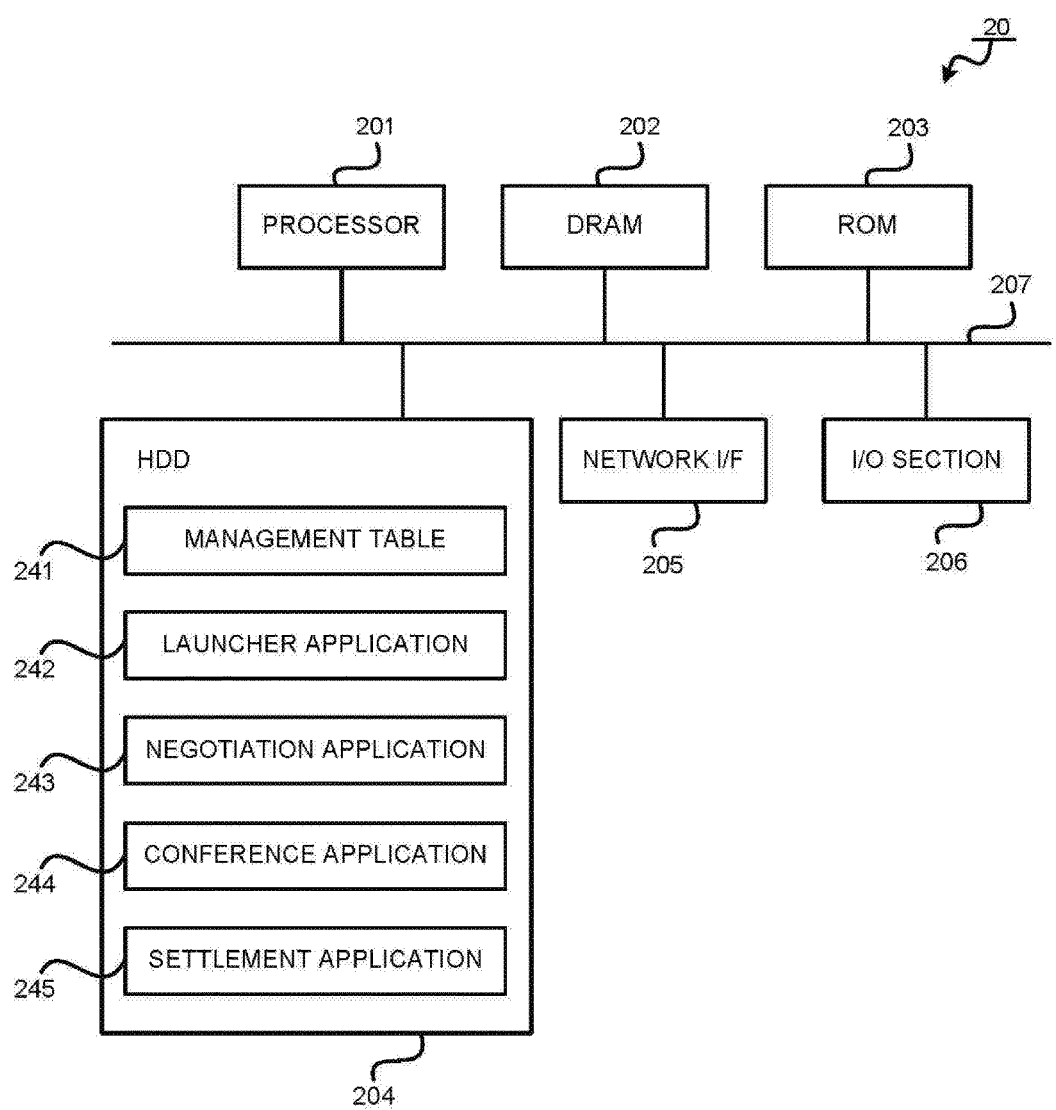
FIG. 3 is a block diagram illustrating an example of the internal configuration of a control section.

The control section 20 controls the information reception of the mouse controller 301 and the pointer controller 401, the display screen of the touch panel display 50 and the operation on the touch panel display 50. The internal configuration of the control section 20 is described with reference to the block diagram of FIG. 3. Structurally identical to existing computers, the control section 20 comprises a processor 201, a DRAM (Dynamic Random Access Memory) 202, an ROM (Read Only Memory) 203, an HDD (Hard disk drive) 204, a network I/F (Interface) 205 and an I/O (Input/Output) section 206, which send or receive data and input or output an instruction telegram and a signal via a bus line 207.

The processor 201, which refers to a CPU (Central Processing Unit) in the present embodiment, expands the programs pre-stored in the HDD 204 and the ROM 203 in the DRAM 202 and carries out operations according to the programs, thereby controlling each device uniformly. The DRAM 202 is a primary storage device for volatile storage, and the ROM 203 stores system programs in a non-volatile manner.

The HDD 204 stores data of the user using the desktop information processing apparatus 100 and the program used by the user. The HDD 204 stores a management table 241 for managing set values of the input devices described herein. The HDD 204 stores a launcher application 242 for uniformly controlling the execution of various applications. Further, a negotiation application 243 for supporting the negotiation between users; a conference application 244 for supporting the management, proceeding and presentation of a held conference and a settlement application 245 for supporting a checkout processing are imported in the HDD 204. The launcher application 242 manages execution commands of each application and provides functions for the arrangement of an icon corresponding to each application and the launching of the application when the icon is touched.

The network I/F 205 is a device which sends data to and receives data from a machine outside the desktop information processing apparatus 100. In this case, the communication may be wired communication or wireless communication. The I/O section 206 controls the communication of each device outside the control section 20. The I/O section 206 outputs an instruction signal and a telegram from the processor 201 to the mouse controller 301, the pointer controller 401 and the touch panel display 50, inputs the resulting telegram and signal from each unit and inputs data obtained from each unit.

Figure 4:
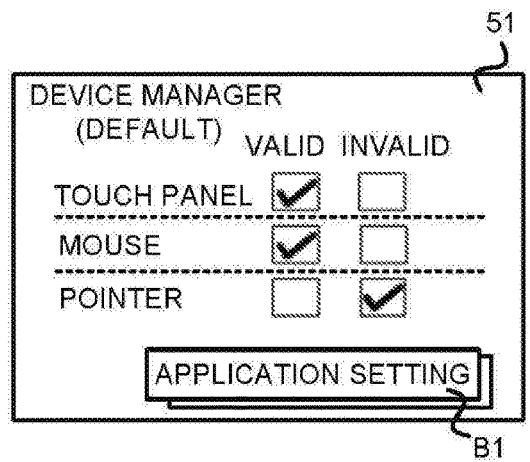
FIG. 4 is a diagram illustrating an example of a management screen of the input device.

FIG. 4 is a diagram illustrating detailed content of a setting screen 51 displayed on the touch panel display 50. The setting screen 51 displays a list of usable input devices. In the present embodiment, each input device, including the touch panel 502, the mouse 30 and the pointer 40, is usable. Further, the setting screen is a screen for receiving set values for validating or invalidating the touch panel 502, the mouse 30 and the pointer 40. Checkboxes indicating 'valid' and 'invalid' are displayed in each column of input devices, and if the checkbox indicating 'valid' is marked with a checkmark, then a corresponding input device is usable. Further, if the checkbox indicating 'invalid' is marked with a checkmark, then a corresponding input device is unusable. In the example shown in FIG. 4, the touch panel 502 and the mouse 30 are valid and the pointer 40 is invalid.

The checkboxes indicating values of 'valid' and 'invalid' at the column of each input device are displayed in a clannish manner, for example, if the user marks one checkbox with a checkmark, then the checkmark in the other checkbox, if marked, is removed. On the contrary, when the user removes the mark of one checkbox, the other checkbox is marked. Further, in the present embodiment, to prevent the situation that no operation can be carried out as all input devices are invalid, a limitation is set so that at least one of the touch panel 502, the mouse 30 and the pointer 40 is valid. If all input devices are invalid, then the control section 20 validates the touch panel 502 in the present embodiment.

The control section 20 carries out the following display control: the control section 20 carries out a control according to the content of the management table 241 to determine whether or not to receive the information sent from the touch panel 502, the mouse 30 and the pointer 40.

Further, the example shown in FIG. 4 is a default setting, when an application designated by the user is not launched, the control section 20 determines to validate or invalidate the touch panel 502, the mouse 30 and the pointer 40 according to the set values shown in FIG. 4 and sets a limitation when the touch panel 502, the mouse 30 and the pointer 40 are invalid. In the default setting set in the present embodiment, the touch panel 502 and the mouse 30, which are used frequently, are set to be valid, and the pointer 40, which is not used frequently, is set to be invalid. The setting on the validity and invalidity of an input device can be changed through an operation of the user.

In addition to the default setting, an input device can be set to be valid or invalid for each application. If the user touches the button B1 (application setting button) shown in FIG. 4, then the touch panel display 50 displays a screen 52 shown in FIG. 5. The user sets the input device for each application through the screen 52. The 'setting name' on the screen 52 is a representative name of a setting, and the set name is displayed on the setting screen 51. 'Application path' designates an associated application, and the name of an execution file is designated using a full path. 'Application name' is a column into which the user can input any value or no value. After inputting the set values, the user sets each input device to be valid or invalid through the operation illustrated in FIG. 4.

If a setting on the validity or invalidity of devices is carried out and a button B2 (button 'OK') is touched, then the control section 20 registers the new input information in the management table 241. If a button B3 (button 'Cancel') is touched, then the control section 20 discards the input information and closes the screen 52. If a button B4 (button 'Change existing setting') is touched, then the control section 20 displays a list of the entries registered in the management table 241 and inserts the content of the existing entry selected by the user from the list in each item shown in FIG. 5 and displays the inserted content. The user changes the existing set value and then touches the button B2 (button 'OK') and then the control section 20 updates the entry in the management table 241 with the changed value. If the button B3 (button 'Cancel') is touched, then the control section 20 carries out no update operation, discards the changed content and closes the screen 52.

FIG. 6 is a diagram illustrating an example of the registration content of the management table 241. The control section 20 acquires a setting name, a path, an application name and values indicating the validity or invalidity of the touch panel 502, the mouse 30 and the pointer 40 via the screen 52 shown in FIG. 5, associates the values with an identification number (ID) to make the acquired information into one record and then registers the resulting record in the management table 241. As to the value of each input device, 1 represents 'valid' and 0 represents 'invalid'.

Figure 7:
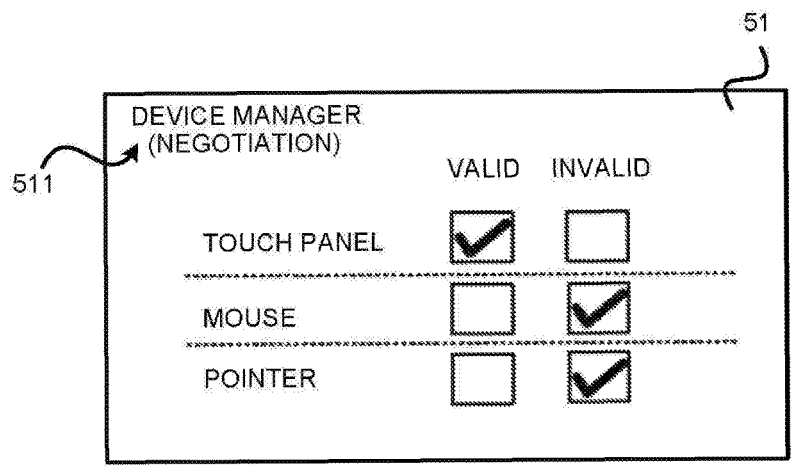
FIG. 7 is a diagram illustrating an example of the setting state of a negotiation application.
Figure 8:
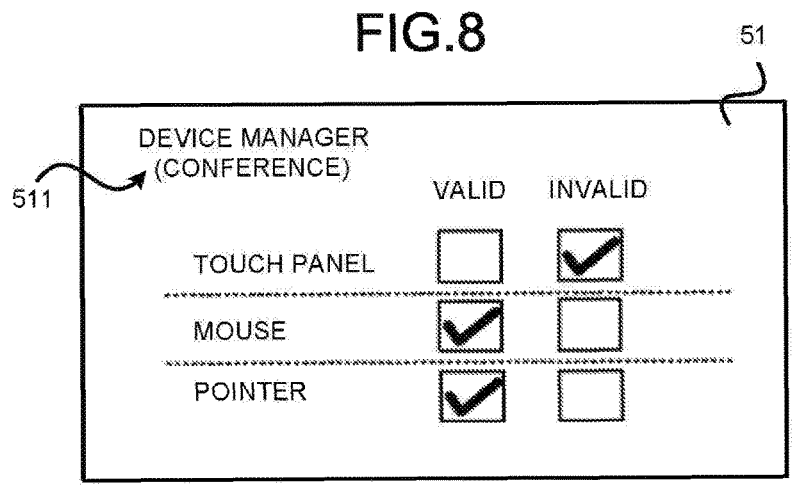
FIG. 8 is a diagram illustrating an example of the setting state of a conference application.
Figure 9:
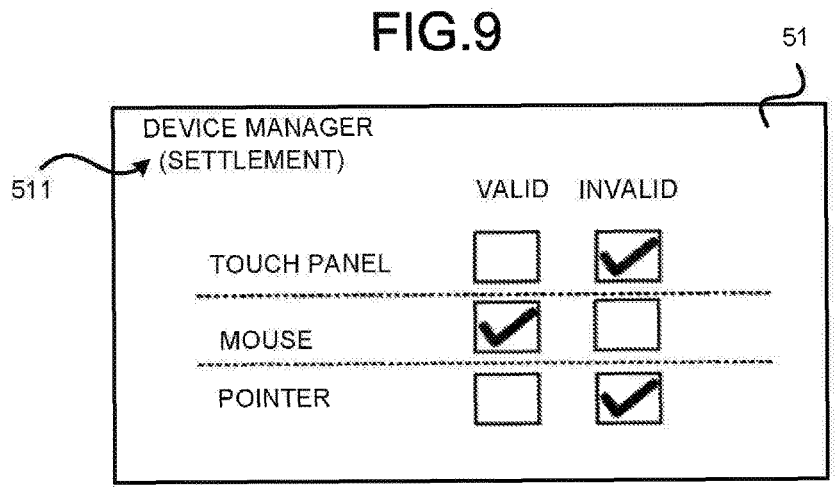
FIG. 9 is a diagram illustrating an example of the setting state of a settlement application.

FIG. 7-FIG. 9 are diagrams illustrating the settings of the input devices for each of the negotiation application 243, the conference application 244 and the settlement application 245. If a corresponding application is launched, then the validity or invalidity of each input device is displayed on the setting screen 51 as shown in FIG. 7 to FIG. 9.

In the case of a negotiation, there are generally a plurality of people operating the information processing apparatus. Thus, the setting of the negotiation application 243, as shown in FIG. 7, validates the touch panel 502 and invalidates the mouse 30 and the pointer 40.

In the case of a conference, generally, one of the participants becomes a speaker (presenter) and the other participants listen to the speaker and watch the content presented by the speaker. Thus, as shown in FIG. 8, the setting of the conference application 244 validates the mouse 30 and the pointer 40 for only one user and invalidates the touch panel 502.

In the case of settlement, sometimes a user needs to input the card number and the password of a credit card, thus, it is preferable that the information processing apparatus is only operable to the user. Thus, the setting of the settlement application 245, as shown in FIG. 9, only validates the mouse 30 and invalidates the touch panel 502 and the pointer 40.

The set values, which are merely described herein as an example, can be changed by the user through an operation on the screens shown in FIG. 7-FIG. 9. The change made here is merely reflected in this launch in the present embodiment, and a user needs to carry out operations on the screen 52 shown in FIG. 5 to change the set values permanently. This setting is the same as the default setting shown in FIG. 4. Apparently, the screens shown in FIG. 7-FIG. 9 can be used to make a permanent change on the set values. In the case of a permanent change, the control section 20 updates the entry value in the management table 241 to be the changed values.

Further, a setting name is displayed in the display column 511 of the management screen 51 (referring to FIG. 7-FIG. 9) so that the user can distinguish the application having the set values.

Figure 10:
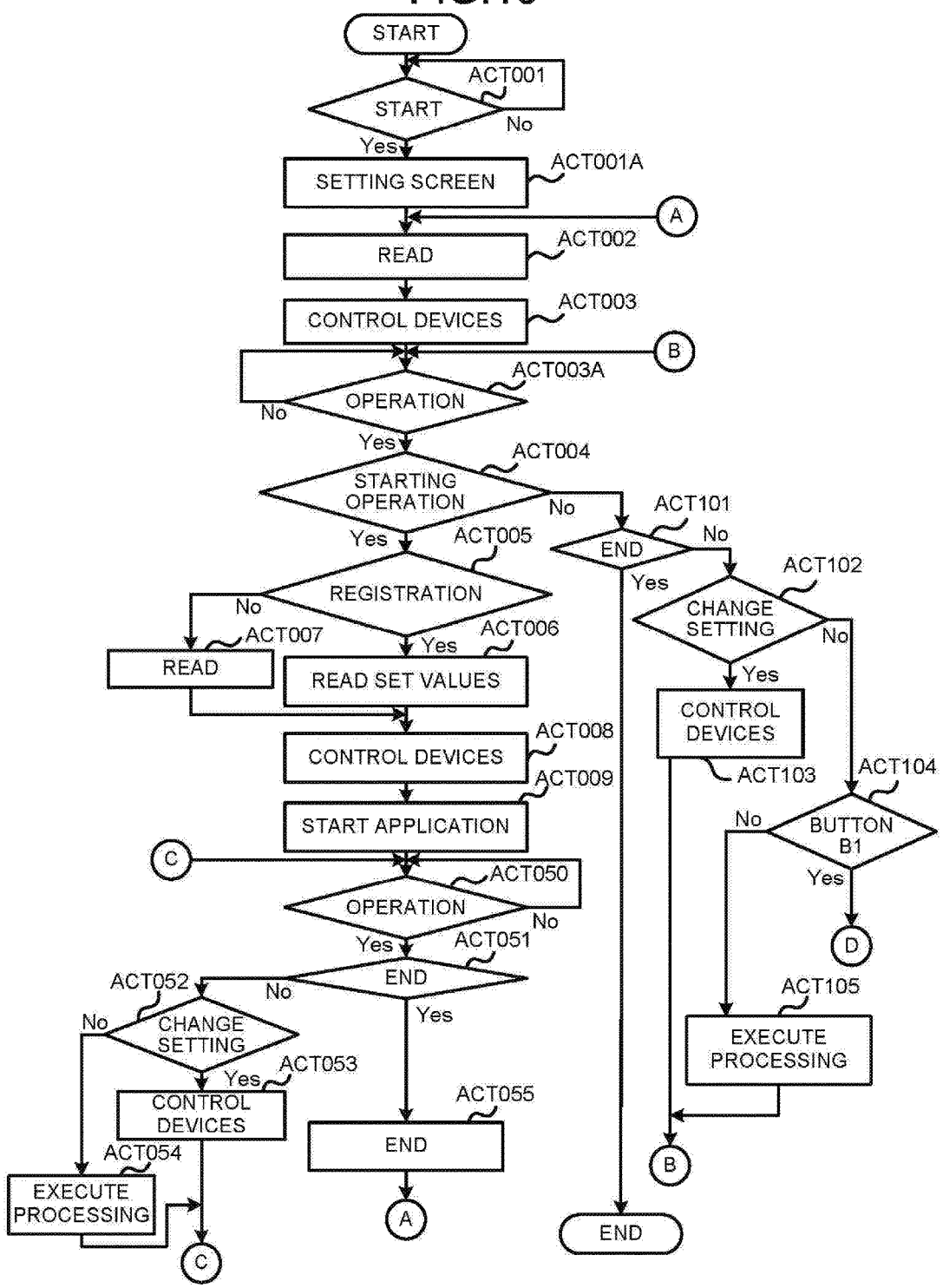
FIG. 10 is a flowchart illustrating an example of the operations carried out by the desktop information processing apparatus according to the embodiment.

Next, an example of the operations of the desktop information processing apparatus 100 is described with reference to FIG. 10 and FIG. 11. The control on the validity and invalidity of input devices and screen display described in the example above is carried out through the execution of the launcher application 242. Further, the main operation subject is the control section 20 in FIG. 10 and FIG. 11, the processor 201 in the control section 20 executes the applications (applications 242-245 in this example) which are imported in the HDD 204 in advance and cooperates with each piece of hardware.

If the launcher application 242 is started (YES in ACT 001), the control section 20 displays the setting screen 51 at a corner of the touch panel display 50 (ACT 001A), and then reads default setting values (ACT 002). The default setting values are the set values of the entry of the ID0001 stored in the management table 241. Further, the reading operation is an operation of developing and storing the entry of the IID0001 stored in the HDD 204 in the DRAM 202. The control section 20 controls operations of the touch panel 502, the mouse 30 and the pointer 40 according to the default values developed in the DRAM 202 (ACT 003). That is, the control section 20 deactivates the input device the setting value of which is 0 and activates the input device the setting value of which is 1. The operations of each device may be directly controlled through the functions of an OS (operating system) or by the driver software provided by the manufacturer of the device.

Next, the control section 20 detects whether or not there is a user operation (ACT 003A). Certainly, the control section 20 only detects an input from a valid device and ignores the input from an invalid device.

If there is a user operation (YES in ACT 003A) and the user operation is an application starting operation (YES in ACT 004), the control section 20 determines whether or not there is a registration of the application by reference to the management table 241 (ACT 005). If there is a registration of the application (YES in ACT 005), the control section reads set values of the application (ACT 006). If the started application is, for example, the negotiation application 243, the control section 20 acquires the entry of the ID0002 from the management table 241 of the HDD 204 and develops the entry in the DRAM 202. If there is no registration of the application, the control section 20 reads the default setting value again (ACT 006). Further, whether or not the started application is registered can be specified through the path of the application.

The control section 20 controls the display of the management screen 51 and controls the validity or invalidity of each device according to the read set values of input devices (ACT 008). Then, the control section 20 starts the application designated in ACT 004 (ACT 009).

The control section 20 detects the operation of the user in the started application (ACT 050). Apparently, the control section 20 only detects an input from a valid device and ignores the input from an invalid device. If there is a user operation (YES in ACT 050) and the user operation is an application ending operation (YES in ACT 051), the control section 20 ends the application (ACT 055) and returns to carry out the processing in ACT 002. If the user operation is not an application ending operation (NO in ACT 051) but an operation of changing the setting of an input device through the setting screen 51 (YES in ACT 052), the control section 20 updates the set values developed in the DRAM 202 to the changed values and controls the validity or invalidity of each device according to the changed set values (ACT 053). The values stored in the DRAM 202 are updated while the management table 241 in the HDD 204 is not updated, in this way, the control section 20 only reflects the validity/invalidity of each input device subjected to the change in this launch.

If the user operation is not the operation of changing the setting of an input device (NO in ACT 052), the control section 20 executes another processing corresponding to the user operation (ACT 054). If the processing in ACT 053 or ACT 054 is ended, the processing returns to ACT 050.

Return to the determination in ACT 004. If the user operation is not an application starting operation in ACT 004 (NO in ACT 004), the control section 20 determines whether or not the user operation is an operation of ending the launcher application 242 (ACT 101), if the user operation is an operation of ending the launcher application 242 (YES in ACT 101), an ending processing is carried out, and then the flowchart shown in FIG. 10 is ended.

If the user operation is not an operation of ending the launcher application 242 (NO in ACT 101), the control section 20 determines whether or not the user operation is an operation of changing the setting of an input device through the setting screen 51 (ACT 102). If the user operation is an operation of changing the setting of an input device (YES in ACT 102), the control section 20 updates the set values stored in the DRAM 202 to the changed values and controls information from the touch panel 502, the mouse 30 and the pointer 40 such that the devices operates according to the values (ACT 103). Then, the flow returns to ACT 003A. Only the operation on an input device which is invalidated after the change is accepted in the determination in ACT 003A. Further, as only the information stored in the DRAM 202 is updated while the management table 241 in the HDD 204 is not updated, the changed content is only reflected during the current starting period of the launcher application 242.

If the user operation is not an operation of changing the setting of an input device (NO in ACT 102), the control section 20 determines whether or not the user operation is an operation of touching the button B1 (application setting button) on the management screen 51 shown in FIG. 4 (ACT 104). If the user operation is not an operation of touching the button B1 (NO in ACT 104), another processing corresponding to the user operation is executed (ACT 105), and then ACT 003A is taken.

Figure 5:
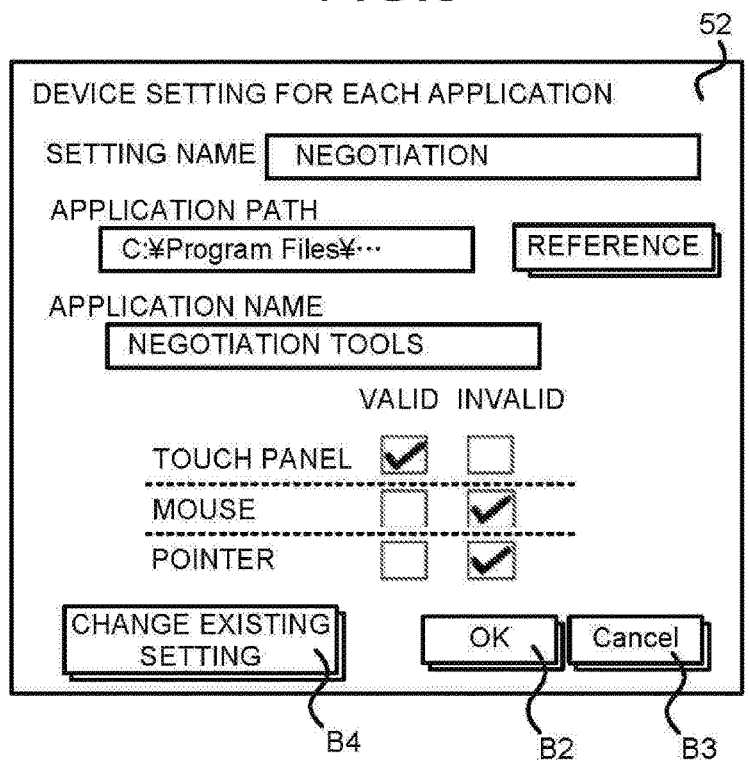
FIG. 5 is a diagram illustrating an example of a setting screen of the input device for each application.
Figure 11:
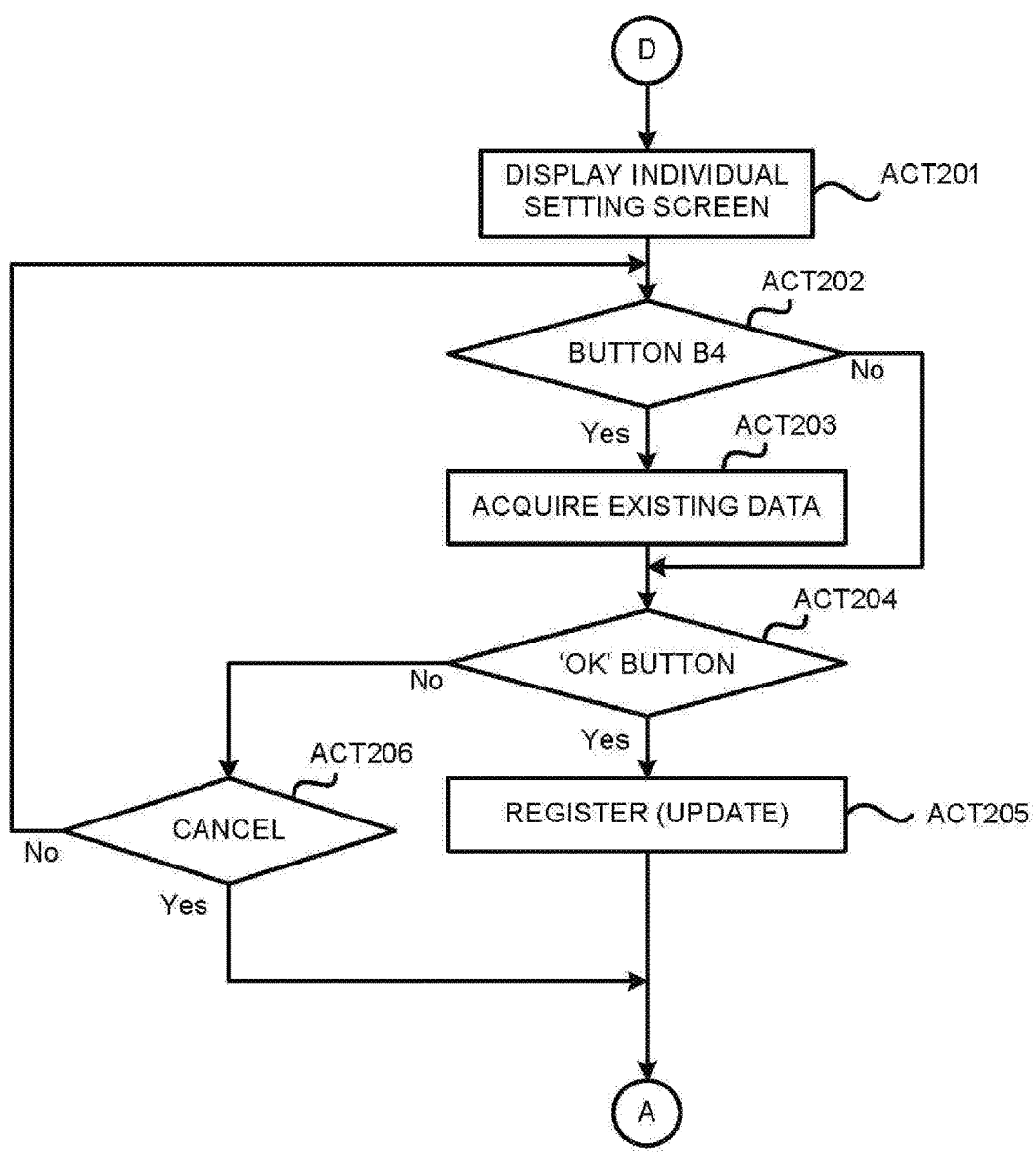
FIG. 11 is a flowchart illustrating an example of the operations carried out by the desktop information processing apparatus according to the embodiment.

If the user operation is an operation of touching the button B1 (YES in ACT 104), the control section 20 displays the screen 52 shown in FIG. 5 for the device setting of each application (ACT 201 in FIG. 11). If the button B4 (button 'Change existing content') in the screen shown in FIG. 5 is touched (YES in ACT 202), the setting names registered in the management table 241 in the HDD 204 are displayed in a list form, and various data of the entry selected from the list is inserted into the screen 52 shown in FIG. 5 (ACT 203). If the button B4 is not touched (NO in ACT 202), ACT 203 is skipped.

If each value shown in FIG. 5 is input and the button B2 (button 'OK') is touched (YES in ACT 204), then the control section 20 acquires the identification number (ID) and registers each set value input in the management table 241 in the HDD 204 in association with the identification number (ACT 205). Then, the flow returns to ACT 002. Further, if the button B4 (button 'Change existing content') is touched and the existing data is read, an update processing is carried out in ACT 205.

If the button B3 (button 'Cancel') is pressed (YES in ACT 206), then the control section 20 carries out no processing, that is, discards the input information, and then the flow proceeds to ACT 002. In this example, as shown in FIG. 11, the processing in ACT 202-ACT 206 is carried out repeatedly until either of the buttons B2 and B3 is touched.

In the present embodiment, the functions for achieving the present invention are prerecorded inside the apparatus, however, the present invention is not limited to this, the same functions may also be downloaded to the apparatus from a network or stored in a recording medium and then installed in the apparatus. The recording medium may be of any form as long as the recording medium is capable of storing programs like a CD-ROM and is readable by the apparatus. Further, the functions achieved by an installed or downloaded program can also be achieved through the cooperation with an OS (Operating System) in the apparatus.

According to embodiments described herein, other input devices can also be used in addition to a touch panel, thus, the crowding caused by a plurality of users is relieved. As a user can selectively validate or invalidate each input device, a preferable operation can be realized according to usage purposes. Further, a screen displaying a list of input devices is displayed at an end part of a continuously displayed screen, and a setting on the validity or invalidity of the input devices can be made in the list, which facilitates an operation of setting the validity or invalidity of the input devices.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:
1. A table type display device comprising:
a display section configured to include a display surface on a top plate;
a touch panel configured to be positioned on the display surface of the display section; an input device controller configured to acquire operation information of a user from an input device different from the touch panel, wherein the input device is a pointer or a mouse; and a control section configured to control the display section to display, a list screen continuously at a corner of a square display area of the display section during executing an application, the list screen is for the user to selectively validate or invalidate the operation on the touch panel and the operation of the input device, and to store, for each application, set values indicating the validity or invalidity of the operations on the touch panel and the input device, and to conduct a control to validate or invalidate the operation on the touch panel and the operation of the input device according to the set values when the application is started.

2. The table type display device according to claim 1, wherein when the executed application is a settlement application, the control section invalidates the operation on the touch panel and validates the operation of the input device.

3. A control method for a table type display device comprising a display section having a display surface on a top plate and a touch panel on the display surface, wherein the table type display device:

acquires operation information of a user from an input device different from the touch panel, wherein the input device is a pointer or a mouse;

displays, a list screen continuously at a corner of a square display area of the display section during executing an application, the list screen is for the user to selectively validate or invalidate the operation on the touch panel and the operation of the input device:

stores, for each application, set values indicating the validity or invalidity of the operations on the touch panel and the input device;

conducts a control to validate or invalidate the operation on the touch panel and the operation of the input device according to the set values when the application is started; and controls the list screen so that at least one of the touch panel and the input device is valid and prevents the user from selecting making both the operation on the touch panel and the operation of the input device invalid.

4. The control method according to claim 3, wherein when the executed application is a settlement application, the table type display device invalidates the operation on the touch panel and validates the operation of the input device.

\* \* \* \* \*